US008925573B2

(12) United States Patent
Borgmeier et al.

(10) Patent No.: US 8,925,573 B2
(45) Date of Patent: Jan. 6, 2015

(54) HEATABLE MEDIA LINE

(75) Inventors: Olav Borgmeier, Hückeswagen (DE); Marco Isenburg, Ratingen (DE); Ulrich Erb, Köln (DE); Volker Zieris, Burscheid (DE); Josef Brandt, Wipperfürth (DE); Otfried Schwarzkopf, Kürten (DE); Martin Lechner, Lindlar (DE); Sascha Rosenfeldt, Dortmund (DE)

(73) Assignee: VOSS Automotive GmbH, Wipperfürth (DE)

( * ) Notice: Subject to any disclaimer, the term of this patent is extended or adjusted under 35 U.S.C. 154(b) by 982 days.

(21) Appl. No.: 12/808,538

(22) PCT Filed: Dec. 8, 2008

(86) PCT No.: PCT/EP2008/066991
§ 371 (c)(1),
(2), (4) Date: Jun. 16, 2010

(87) PCT Pub. No.: WO2009/080477
PCT Pub. Date: Jul. 2, 2009

(65) Prior Publication Data
US 2010/0263740 A1 Oct. 21, 2010

(30) Foreign Application Priority Data
Dec. 21, 2007 (DE) ............. 20 2007 018 089 U

(51) Int. Cl.
| F16L 53/00 | (2006.01) |
| H05B 3/06 | (2006.01) |
| H05B 3/58 | (2006.01) |
| F24H 1/00 | (2006.01) |
| F16L 25/01 | (2006.01) |
| F01N 3/20 | (2006.01) |
| H01R 13/00 | (2006.01) |

(52) U.S. Cl.
CPC .............. *F16L 53/008* (2013.01); *F16L 25/01* (2013.01); *F01N 3/2066* (2013.01); *F01N 2610/02* (2013.01); *F01N 2610/10* (2013.01); *F01N 2610/14* (2013.01); *F01N 2610/1486* (2013.01); *H01R 13/005* (2013.01)
USPC ............. 137/341; 138/33; 219/535; 219/541; 392/480

(58) Field of Classification Search
USPC ............. 137/341, 375; 138/33, 149; 219/535, 219/541; 392/480
See application file for complete search history.

(56) References Cited

U.S. PATENT DOCUMENTS 1,006,244 A * 10/1911 Low et al. ...................... 123/557
2,178,721 A * 11/1939 Daniels ......................... 219/643
(Continued)

FOREIGN PATENT DOCUMENTS

| CA | 2 008 633 A1 | 7/1990 |
| DE | 2749098 A1 | 5/1978 |

(Continued)

OTHER PUBLICATIONS

PCT/EP2008/066991—International Search Report.

*Primary Examiner* — Craig Schneider
*Assistant Examiner* — Jonathan Waddy
(74) *Attorney, Agent, or Firm* — Brinks Gilson & Lione

(57) ABSTRACT

The present invention relates to an electrically heatable media line (1), comprising a fluid line (2) and at least one fluid connector (4) connected to a line end (2*a*). The fluid line (2) and the fluid connector (4) respectively have electric heating means (6, 10), wherein the fluid line (2) and/or the fluid connector (4) including electric connections (16) of the heating means (6, 10) are/is enclosed by a plastic molding compound.

19 Claims, 8 Drawing Sheets

(56) References Cited

U.S. PATENT DOCUMENTS

| | | | |
|---|---|---|---|
| 3,932,727 A | | 1/1976 | True |
| 3,986,732 A | | 10/1976 | Stanley |
| 4,435,005 A | | 3/1984 | Berger et al. |
| 5,012,839 A | * | 5/1991 | Rogers et al. ............... 137/341 |
| 5,093,896 A | * | 3/1992 | Moore et al. ............... 392/441 |
| 6,617,556 B1 | | 9/2003 | Wedel |
| 6,941,963 B2 | * | 9/2005 | Maula et al. ............... 137/1 |
| 2003/0034648 A1 | | 2/2003 | Zitkowic et al. |
| 2005/0083638 A1 | | 4/2005 | Warren et al. |
| 2007/0119848 A1 | * | 5/2007 | Ellis et al. ............... 219/541 |
| 2007/0176418 A1 | | 8/2007 | Frogneborn et al. |

FOREIGN PATENT DOCUMENTS

| | | | |
|---|---|---|---|
| DE | 2752374 | A1 | 5/1979 |
| DE | 9307361 | * | 7/1993 |
| DE | 19510193 | A1 | 9/1996 |
| DE | 29807763 | U1 | 9/1999 |
| DE | 19818649 | A1 | 10/1999 |
| DE | 20017921 | * | 2/2002 |
| DE | 20115436 | U1 | 2/2003 |
| DE | 20214847 | U1 | 2/2004 |
| DE | 103 26 894 | B3 | 9/2004 |
| DE | 20 2005 004 602 | | 7/2005 |
| DE | 20 2006 003 590 | | 6/2006 |
| DE | 202005013691 | * | 1/2007 |
| DE | 102006034697 | A1 | 2/2007 |
| EP | 0 379 635 | A | 8/1990 |
| EP | 0 764 810 | | 3/1997 |
| EP | 1 610 049 | A | 12/2005 |
| EP | 1 698 769 | A2 | 9/2006 |
| EP | 1 710 484 | | 10/2006 |
| EP | 1 777 452 | A | 4/2007 |
| EP | 1553270 | | 7/2007 |
| EP | 1 818 588 | A1 | 8/2007 |
| EP | WO 2009/013342 | A2 | 1/2009 |
| FR | 1 065 308 | | 5/1954 |
| GB | 2 423 686 | A | 2/2002 |
| IT | WO 2007/032034 | A1 | 3/2007 |
| JP | 08152082 | | 6/1996 |
| JP | 10306889 | | 11/1998 |
| JP | 2000065266 | | 3/2000 |
| JP | 2000266261 | | 9/2000 |
| KR | WO 2005/001322 | A1 | 1/2005 |
| SE | WO 2005/124219 | A1 | 12/2005 |
| SE | WO 2007/073286 | A1 | 6/2007 |
| WO | 2007/073286 | A1 | 6/2007 |

* cited by examiner

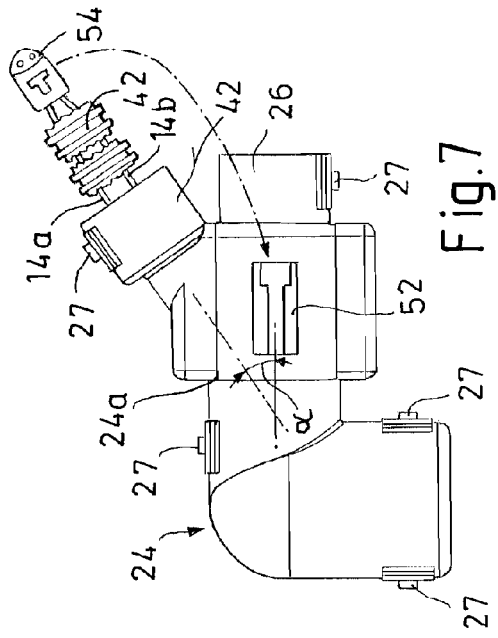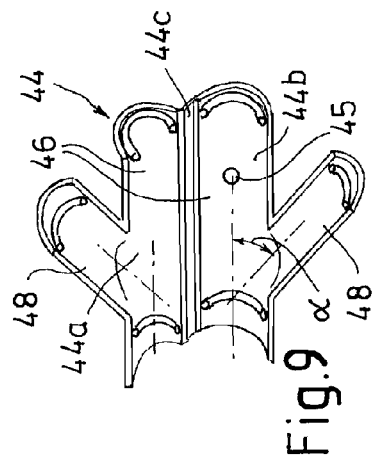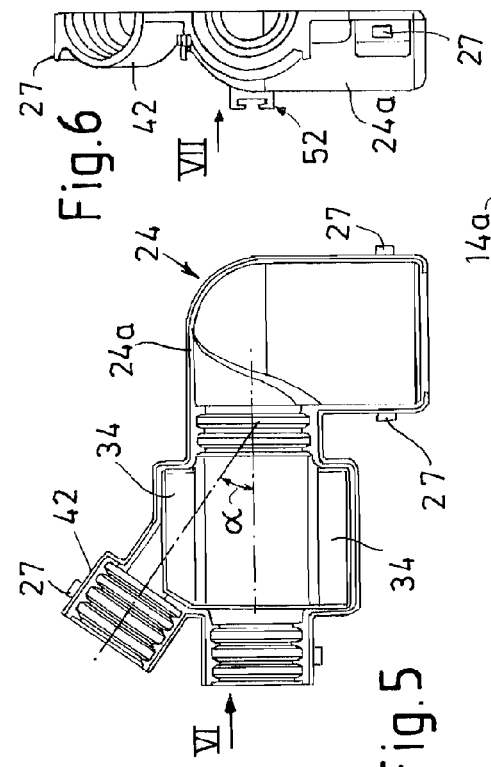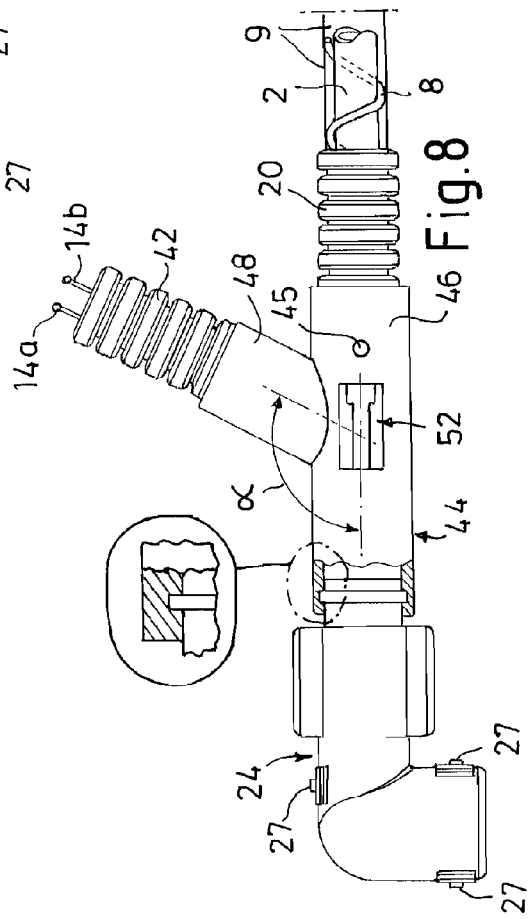

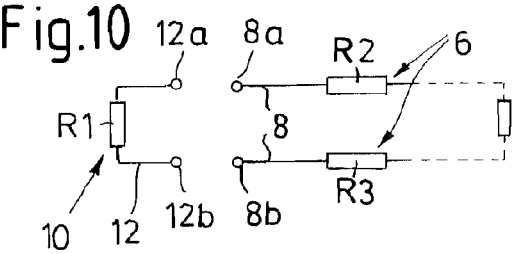
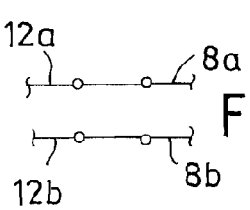
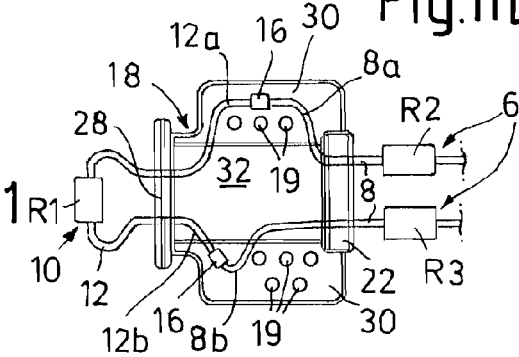
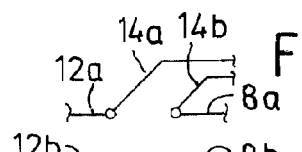
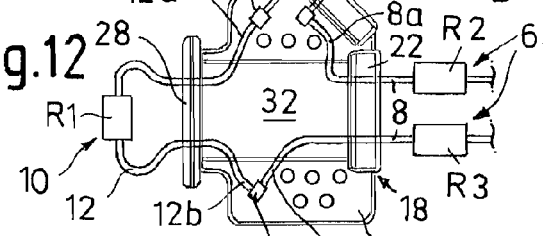
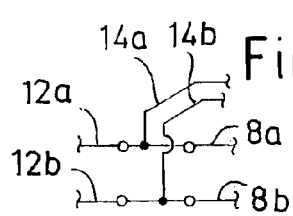
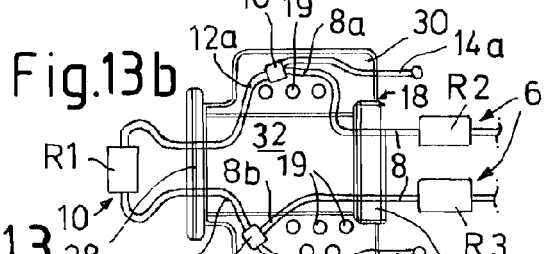
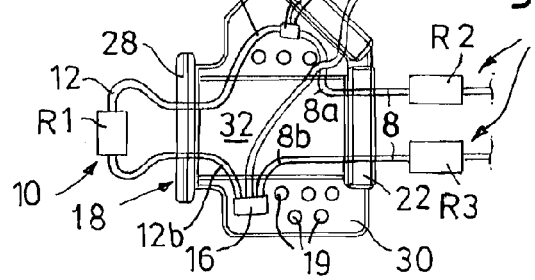

HEATABLE MEDIA LINE

CROSS-REFERENCE TO RELATED APPLICATIONS

This application claims priority to German Patent Application No. 20 2007 018 089.6, filed Dec. 21, 2007 and PCT patent application PCT/EP2008/066991 filed Dec. 8, 2008.

FIELD OF THE INVENTION

The present invention relates to an electrically heatable media line, that is comprised of a fluid line and at least one fluid connector connected to a line end, where the fluid line and the fluid connector respectively have electric heating means.

BACKGROUND AND SUMMARY OF THE INVENTION

The application of media lines of this type is particularly useful in motor vehicle applications with media that tend to freeze even at relatively high ambient temperatures because of their freezing point which can affect certain functions. This, for example, is the case with water lines used in windshield washer systems and particularly in lines used for conveying an aqueous urea solution, which is used as a nitrogen oxide ($NO_X$) reduction additive for diesel motors with so-called SCR-catalytic converters. The electrical heating means can therefore be activated at low temperatures to prevent freezing or to melt the already frozen media.

Such a media line is described in WO 2007/073286 A1. For this purpose, an encapsulated connector is provided in a transitional area between the fluid connector, which is designed as a connector component of a fluid connector means, and the fluid hose, the encapsulated connector being disposed between the fluid connector and one end of a protective sheath that encloses the fluid line. A hollow area is disposed between the line and the encapsulated connector that also serves to house the electrical connections of the heating means. The connections are loosely placed in this hollow area, providing only inadequate protection against mechanical and other loads. A loose and undefined arrangement could cause the electrical connections to come into contact with one another and possibly cause a short circuit. The manufacture and installation of the known media line is furthermore difficult.

The underlying object of the present invention is to develop a heatable media line of the described type in such a manner that it can be manufactured using simple means while providing a high degree of process reliability and guaranteeing durable and secure performance characteristics.

According to the present invention, it is intended that the fluid line and/or the fluid connector within an arbitrary area, including the electrical connections of the heating means, are enclosed (over-molded or molded) by a plastic molding compound, particularly a thermo-plastic molding compound, for example on PA-basis. This will ensure that the necessary electrical connections are firmly bonded imbedded in a formed attachment component and are thus immovably fixed and protected against mechanical and other influences as well as electrically insulated against one another. The forming of the attachment component is preferably accomplished within a transitional area of the line end and fluid connector. This allows the advantageous development of a molded unit, which is comprised of the fluid line and at least one fluid connector connected to a line end and its heating means.

According to the present invention, a simple and reliable manufacturability can be achieved by first connecting a line end of the fluid line to the fluid connector and subsequently establishing the electrical connections between the heating media and, if applicable, the external supply leads and, finally, preferably over-molding a transitional area between the fluid connector and the fluid line including the electrical connections with a plastic compound. It is additionally or alternatively possible to (only) over-mold the fluid line with a plastic compound in an arbitrary, for example, approximately central section of its overall length while integrating the electrical connections of the heating media. A separate junction housing, which encloses the area of the formed plastic component, is then preferably installed in this area, the electrical supply leads being guided outward via a separate junction.

Additional preferred embodiment characteristics of the invention are included in the attached claims and the subsequent description.

BRIEF DESCRIPTION OF THE DRAWINGS

Exemplary embodiments of the invention will be explained in more detail on the basis of the included figures. The drawings show:

FIG. 5 shows a separate view of the interior of an external housing half relating to the arrangement according to FIG. 4, FIG. 6 is a view of the external housing half in the direction of arrow VI of FIG. 5, FIG. 7 is a view of the external housing half in the direction of arrow VII of FIG. 6, FIG. 8 is a side view of an alternative embodiment of a two-part external housing with an additional junction piece, FIG. 9 is a separate perspective view of the junction piece according to FIG. 8 in its opened state, FIG. 10 is a schematic equivalent circuit diagram of the electrical heating means of the fluid connector and of the fluid line, FIG. 11-13 show different switching options for the heating means, whereas FIGS. 11a, 12a and 13a each illustrate a schematic circuit diagram and FIGS. 11b, 12b, 13b and 13c each illustrate the area according to the present invention of the formed attachment component made of a plastic compound together with electrical leads and connections.

The same reference numerals are used to identify identical components in the different diagrams of the illustrations.

DETAILED DESCRIPTION OF THE INVENTION

Figure 14:
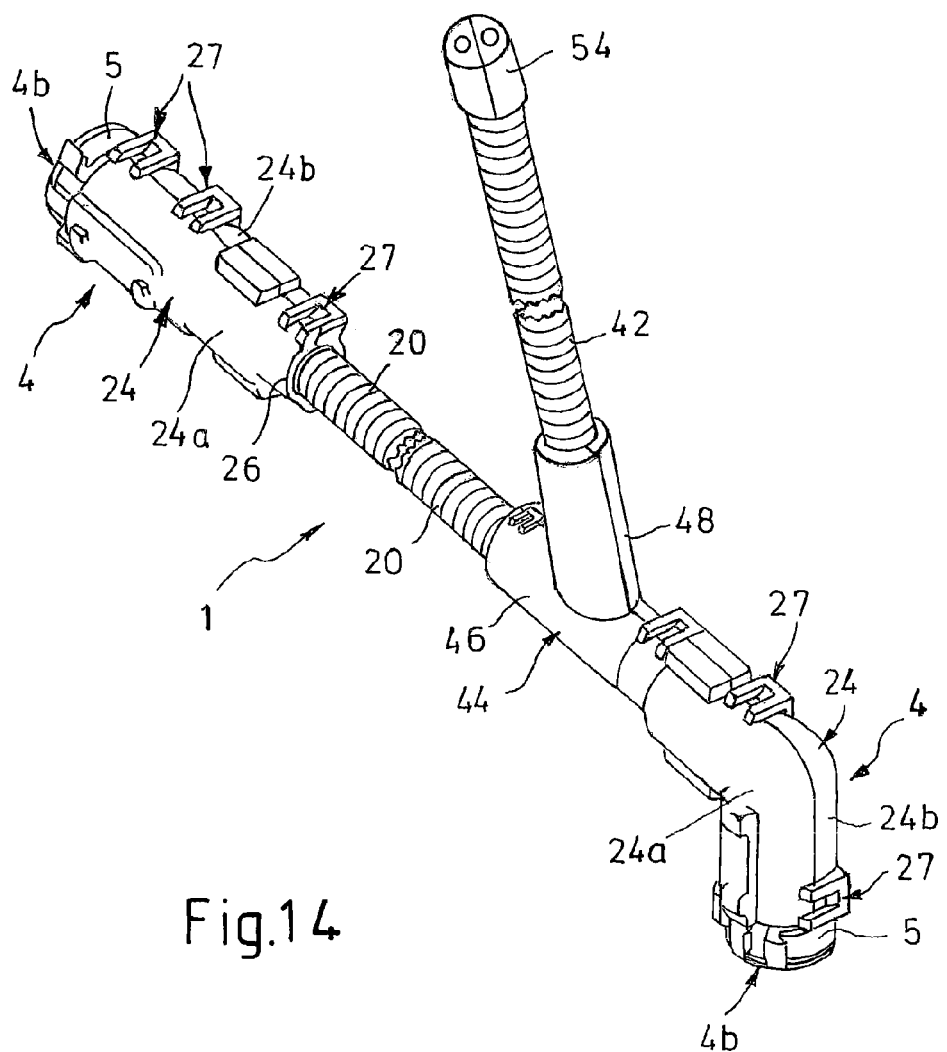
FIG. 14 is a perspective view of a made-to-measure media line, which partially corresponds to the arrangement according to FIG. 8.

FIG. 1 through 4 show an electrically heatable media line 1 is comprised of a fluid line 2 and at least a fluid connector 4. The fluid connector 4 is tightly connected circumferentially to a line end 2a of the fluid line 2. The fluid line 2 can be analogously connected to another (second) fluid connector 4 at the other end (see FIGS. 14 and 15), whereas the respective fluid connector 4 can be designed as an angled or straight connector (cf. FIGS. 19 and 20). The other end of the fluid line 2 can alternatively be directly connected to any device, a tank for example. The fluid line 2 is preferably designed as a hose made of plastic material (e.g. polyamide). The fluid connector 4 preferably comprises a connector component of a fluid plug-in connection. For this purpose, the fluid connector 4 is comprised of a connector section 4a for connection to the fluid line 2 and/or with its line end 2a (in particular, refer to FIG. 2) as well as of a plug-in connection 4b, which in the illustrated exemplary embodiments is designed as a bushing to receive a not illustrated fluid plug-in. A radially elastic clamp 5 is disposed in the area of the bushing to provide a releasable lock for the inserted fluid plug-in. Alternatively to the illustrated arrangement, the plug-in connection 4b can basically also be a plug. The connector section 4a is preferably designed as a receptacle for the plugging in the line end 2a, a permanent firm bond being particularly achieved by means of gluing or welding, in particular by laser welding. For this purpose, the fluid connector 4 is particularly comprised of one-piece molded plastic component, preferably made of fiber-reinforced polyamide, such as PA 6.6 GF 30 or PA 12 GF 30. At least the area of the connecting section 4a should be "transparent" to laser beams.

As already mentioned, the fluid connector can be designed as a straight or angled connector, the axis of sections 4a and 4b forming a specific angle, for example 90°.

The fluid line 2 is provided with electrical heating means 6, particularly in the form of at least one heating lead 8, which preferably extends helically over the circumference of fluid line 2. The heating lead 8 may be comprised of a helically coiled feed lead that extends from one lead end to the other end and, for example, of a straight or coiled return lead, which will provide good heat distribution. The heating lead 8 can be attached to the fluid line 2 by means of a fixing layer 9 which tightly encloses the fluid line 2 including the heating lead 8, for example by means of adhesive tape that is helically wound around the fluid line 2, or attached to the fluid line 2 in another appropriate manner.

Furthermore, the fluid connector 4 is provided with electrical heating means 10, which are preferably also comprised of at least one heating lead 12 that extends over its outer circumference. The heating lead 12 can also be comprised of a coiled feed lead and a short return lead.

The lead ends 8a, 8b and 12a, 12b of the heating leads 8 and 12 are particularly connected (coupled) to one another and/or through electrical connections 16 connected to the external supply leads 14a and 14b in a transitional area between the fluid line 2 and the fluid connector 4. Regarding these connections 16 (which are not included in FIG. 2), reference is made to these alternatives that are illustrated in FIG. 10 through 13, which will be explained in more detail below.

The designs according to FIG. 1 through 14 provide that the fluid line 2 and the fluid connector 4 have an attachment component 18 in a transitional area which according to the present invention is formed (for example molded or over-molded) of a plastic compound integrating the electrical connections 16 of the heating means 6 and 10. This creates a molded unit consisting of the fluid line 2 and the fluid connector 4 with their heating means 6 and 10, the necessary electrical connections 16 being embedded in the over-molded attachment component 18 and consequently protected against any mechanical or other influences as well as electrically insulated against one another. This molded unit is particularly referenced in FIG. 3. The molding compound should preferably consist of a transparent material, which allows for an easy external inspection of the position of the embedded electrical connections 16.

Molding or over-molding to form the attachment component 18 is carried out using an appropriate forming tool. This tool may, for example, include pin-shaped positioning elements for the electrical connections 16 to position them during the forming process in such a manner that they will be perfectly embedded into the plastic compound. Furthermore, any contact between the insulated metallic ends of the heating leads must be avoided. After the forming process according to FIG. 1 through 4 and 11b through 13c, these positioning attachments will leave holes 19 of no further significance.

In a preferable embodiment of the invention the fluid line 2 together with its heating means 6 is enclosed in a coaxial sheath 20. This sheath 20 is in particular comprised by a corrugated tube, which is a parallel corrugated protective tube, particularly made of a plastic compound (PA, for example). In this connection, it is particularly advantageous if the molded attachment component 18 also includes an end section of the sheath 20 in a form-fitting and/or firmly bonded manner. For this purpose, the attachment component 18 can have a formed annular collar 22 in this area.

In arrangements, where the electrical connections 16 that are embedded in the attachment component 18 are also connected to supply leads 14, the supply leads are routed to the outside of the attachment component 18 (see FIG. 2 and FIG. 11 through 13).

In another preferred embodiment, the fluid connector 4 is at least enclosed by an external housing 24 in the area of its heating means 10. This external housing 24 is preferably comprised of two housing sections 24a, 24b that are half-shells and can be locked together, only one of the housing halves (24a) being shown in FIGS. 1, 2 and 4. Additional reference is made to FIG. 5 through 7 and particularly to FIG. 14. In a convenient arrangement, the external housing 24 sectionally also encloses the fluid line 2 and preferably one end section of the sheath 20. The sheath 20 can advantageously be fixed inside the external housing 24, in particular in a form-fitting arrangement. For this purpose, the external housing 24 has a flanged socket 26 with inner circumferential ribs 26a that radially engage in circumferential grooves of the corrugated tube sheath 20 (see FIGS. 1, 2 and 4 as well as FIG. 21). Both housing halves can, for example, be connected to one another by means of at least one foldable integral hinge so that, together with the fluid connector 4, they can be closed and locked to one another by folding them using the locking means 27. The housing half-shells can also be two separate parts. In this case the housing sections should at least be configured as identical parts.

Furthermore, the formed attachment component 18 and the external housing 24 are preferably fitted to one another in such a manner that a form-fitting fixing of the attachment component 18 is achieved within the external housing 24. For this purpose, the attachment component 18 can have an annular collar 28 that sits inside a radial groove within the external housing 24. This arrangement provides an effective tension relief for the heating leads 8 and 12. The attachment component 18 can also comprise flange- or wing-shaped edges 30 that are diametrically opposed on the same plane, which originate from a central, approximately cylindrical base section 32, the base section 32 enclosing the transitional area between the connecting section 4a of the fluid connector 4 and the line end 2a of the fluid line 2. The edges 30 provide an effective twist protection of the attachment component 18 within the external housing 24 and can also be used to house the electrical connections 16 at arbitrary locations (cf. FIG. 11 through 13).

The external housing 24 has an approximate negative contour of the attachment component 18 on its inner side. The edges 30 are included in the enlargements 34 of the external housing 24.

After installing the external housing 24 any internal space that remains vacant can preferably at least partially be filled (molded) with plastic (second molding step with preferably the same material as for the attachment component 18). For this purpose, the external housing has at least one opening 36 for inserting a molding compound. The opening 36 is preferably disposed in for filling the holes 19 of the attachment component 18.

Figure 1:
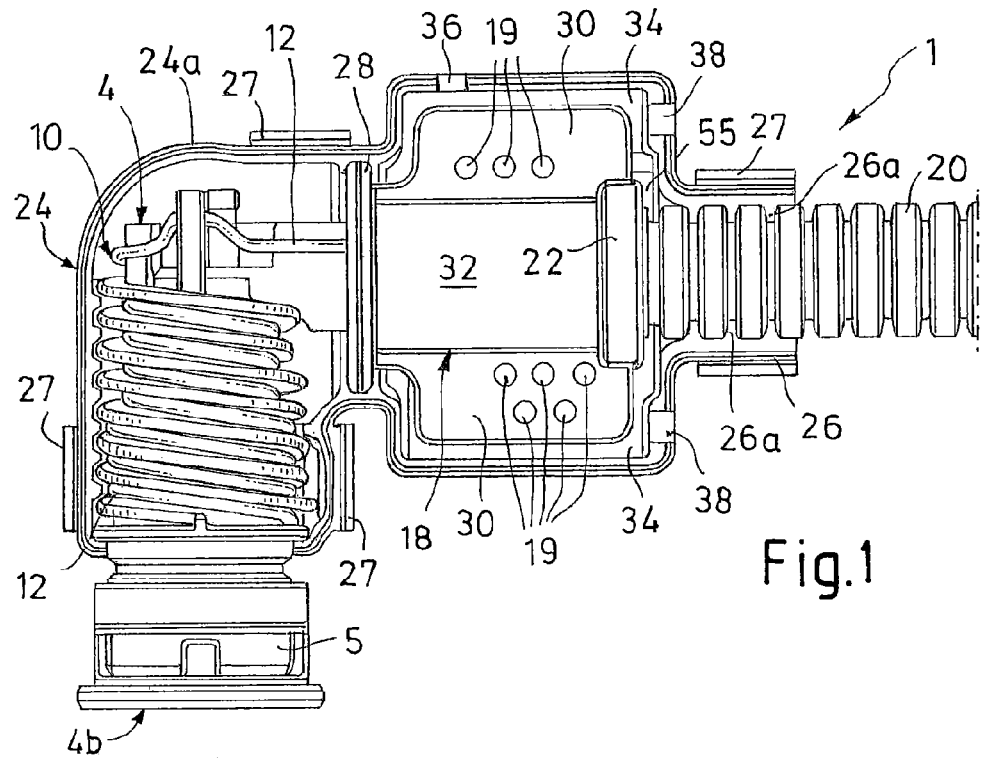
FIG. 1 shows an enlarged side view of one end section of a media line according to the present invention with additional representation of a housing half of an external housing as well as a tubular sheath that encloses the fluid line.
Figure 2:
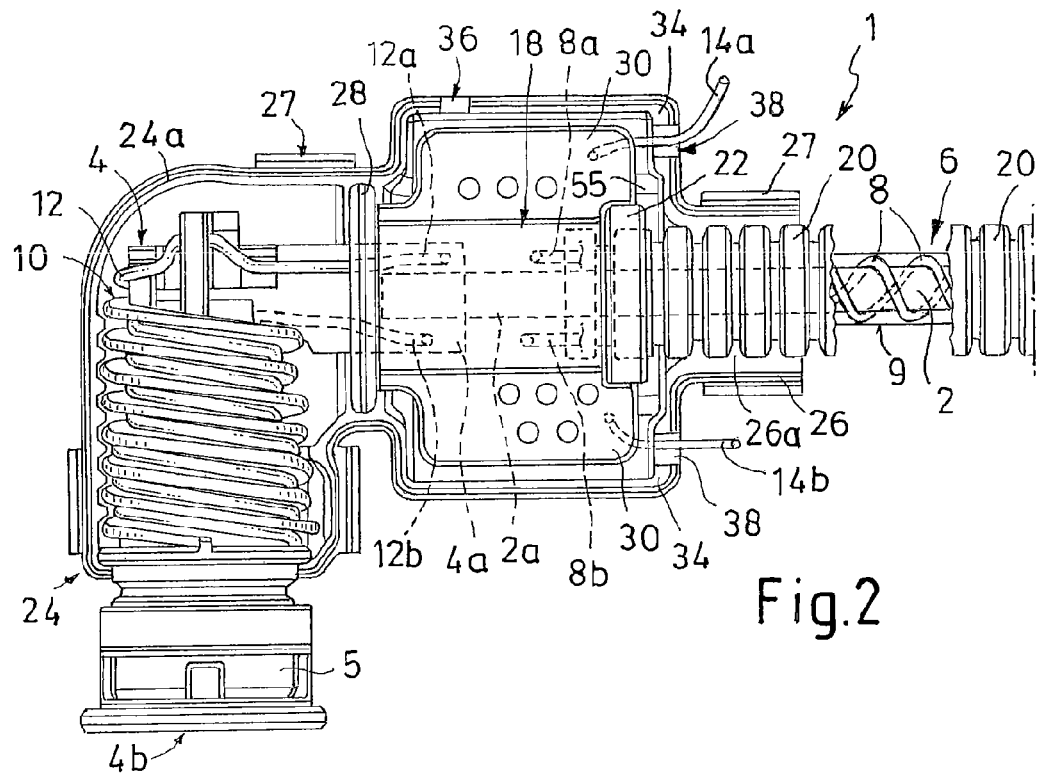
FIG. 2 shows a representation similar to FIG. 1 with an additional illustration of heating leads and external supply leads.
Figure 3:
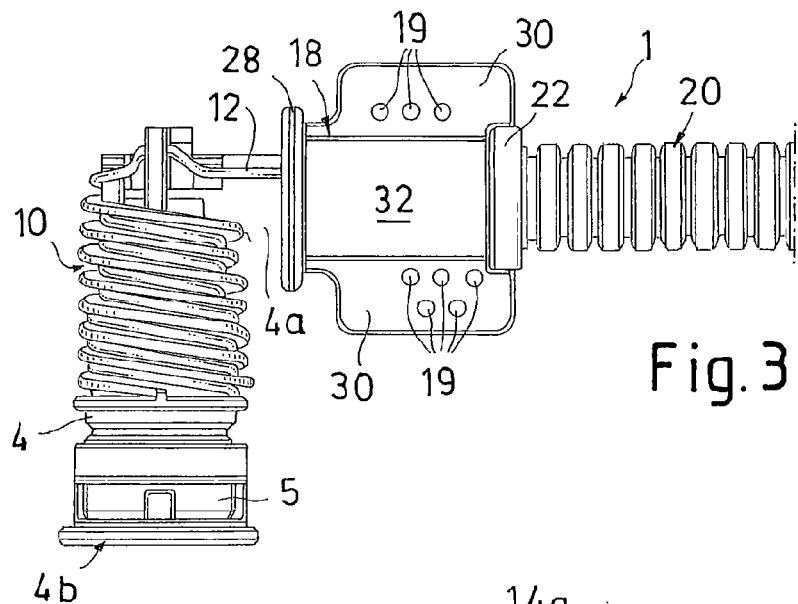
FIG. 3 shows a representation similar to FIG. 1 on a reduced scale but without the external housing component.

In the embodiment according to FIGS. 1 and 2 the external housing 24 can have through-openings 38 for the electrical supply leads 14a and, 14b. The supply leads thus routed to the outside can be connected to connectors, which are not shown here, at their other ends, particularly electrical plug-in connectors to connect to a vehicle's on-board electrical system.

Figure 4:
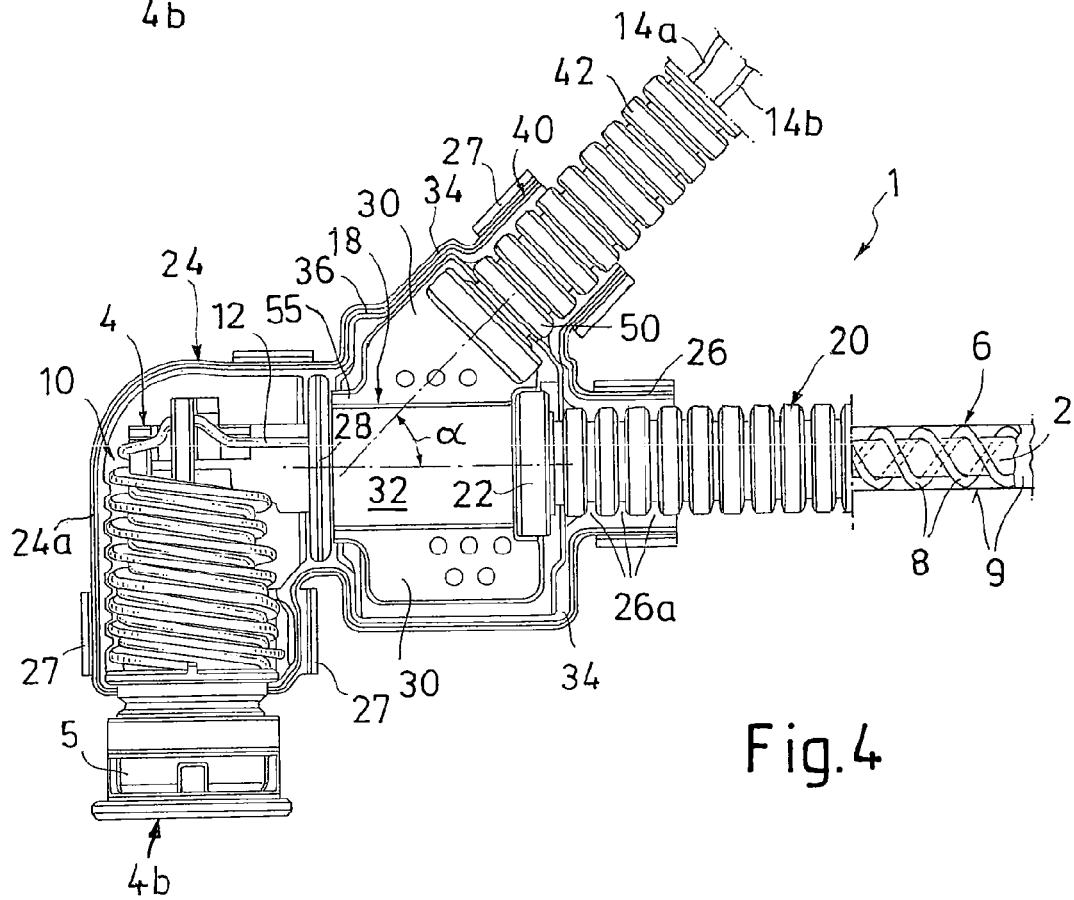
FIG. 4 shows an advantageous embodiment of the invention in a view analogous to FIGS. 1 and/or 2.

In an alternative embodiment according to FIG. 4, it is proposed that the external housing 24 preferably comprises a tube portion-shaped junction 40 for the supply leads 14a and 14b. This junction 40 also preferably includes one end of the lead sheath 42 in a form-fitting arrangement, wherein the lead sheath 42 which is analogues to the sheath 20 is also formed by means of a corrugated tube. For this purpose, the junction 40 comprises respective lugs on the inside to engage the ribs of the lead sheath 42. Depending on the angular orientation (α in the range of 20° to 160°), junction 40 can form either a Y-junction (as shown) or also a T-junction. The lead sheath 42 and the sheath 20 may have different or, particularly, however, for cost reasons, the same diameters.

In a further embodiment option according to FIGS. 8 and 9 an additional junction piece 44 can be provided, which according to FIG. 9 is particularly comprised of two half-shells 44a and 44b that preferably are connected one-piece to one another by means of an integral hinge 44c. The halves can be folded by means of the integral hinge 44c and locked together. The junction piece 44 is comprised of a tubular passage section 46 enclosing the fluid line 2, and a junction 48 for the supply leads 14.

Junction 48 is configured similar to the above described junction 40. At one end, the passage section 46 is directly connected to the external housing 24 by form-fittingly receiving the flanged socket 26. This connection can either be twistable relative to the directional adjustment of junction 48, or can be secured against twisting. At the other end, the passage section 46 form-fittingly receives the sheath 20 of the fluid line 2. The junction piece can at least be partially molded with plastic via at least one opening 45 (FIG. 8, 9).

As is additionally apparent from FIG. 4, the lead sheath 42 is preferably integrated form-fittingly and/or firmly bonded with its end into the attachment component 18, whereas the latter can have another annular collar 50.

According to FIGS. 7 and 8, on the outside the external housing 24 and/or the junction piece 44 can (each) have a retainer 52 for holding an electric connector piece 54 (FIGS. 7 and 14) in a fixed position which is connected to the supply leads 14. The retainer 52 can be configured as a slide-in insert; it serves for the temporary fixation of the connector piece 54 during storage and transport until the supply leads 14 are connected during installation. Then, only the connector piece 54 must be removed from the retainer 52 and connected to a counter-connector. It is of course possible to support the connector piece 54 by other means, particularly by rigid and/or form-fitting means or also by means of a hock-and-loop closure or similar means.

At this point, different options will be explained regarding the electrical switching of the heating means 6 and 10 on the basis of FIG. 10 through 13. The equivalent circuit diagram in FIG. 10 illustrates the heating lead 12 as electrical resistor R1. The heating lead(s) 8 of fluid line 2 are drawn as resistors R2 and R3 (example for feed- and return lead).

According to FIG. 11, the lead ends 8a and 8b can each be connected separately to one of the lead ends 12a and 12b. In this case a supply voltage is supplied on the other, not illustrated, side of the fluid line 2 and/or the heating lead 8. The heating lead resistors R1, R2, R3 are connected in series.

According to FIG. 12, the supply leads 14a and 14b can be connected to a series connection of the heating leads 8 and 12. For this purpose, the supply leads 14a and 14b are connected to a lead end 8a as well as to a lead end 12a, while the other lead ends 8b and 12b are directly connected to one another.

The circuitry illustrated in FIG. 13 is a parallel connection of heating leads 8 and 12, whereas one supply lead 14a is connected to two lead ends 8a and 12a and the other supply lead 14b is connected to the lead ends 8b and 12b. According to FIG. 13b, the supply leads 14a and 14b are directly guided outward from the attachment component 18 to be then guided through the through-openings 38 in the installed state of the external housing 24. The arrangement according to FIG. 13c is intended for the embodiment according to FIG. 4 with the junction 40.

The construction of the media line will hereafter be explained in brief.

First, a line end 2a of fluid line 2 is connected to the connecting section 4a of the fluid connector 4. It is preferably a non-detachable, firmly bonded connection, particularly by means of laser welding.

The necessary electrical connections 18 are subsequently established between the heating means 6 and 10 and, if appropriate, also to the supply leads 14. The transitional area between the fluid line 2 and the fluid connector 4 is then sprayed with plastic, such that an attachment component 18 including the electrical connections 18 is formed.

The fluid line 2 can preferably be provided with the sheath 20 and previously also optionally with the fixing layer 9 prior to over-molding. In the case of a one-piece corrugated tube, this will be axially slipped over the fluid line. This must in any case be carried out prior to connecting the other end of fluid line 2. As an alternative, a double-shell, longitudinally separated sheath 20 can be provided, which can be radially installed. The half-shells can, for example, also be fixed by means of heat shrink tubing. In the subsequent over-molding process one end section of sheath 20 is preferably integrated with the attachment component 18. In the case of the arrangement with junction 40 according to FIGS. 4 and 13c, this also preferably applies to the lead sheath 42.

In a preferred embodiment, the fluid connector 4 is finally provided with an external housing 24, a remaining vacant space 55 within the external housing 24 being at least partially molded with plastic. According to FIGS. 19 and 21, the air volume contained in the vacant space 55 can alternatively also be used as heat insulation.

Figure 15:
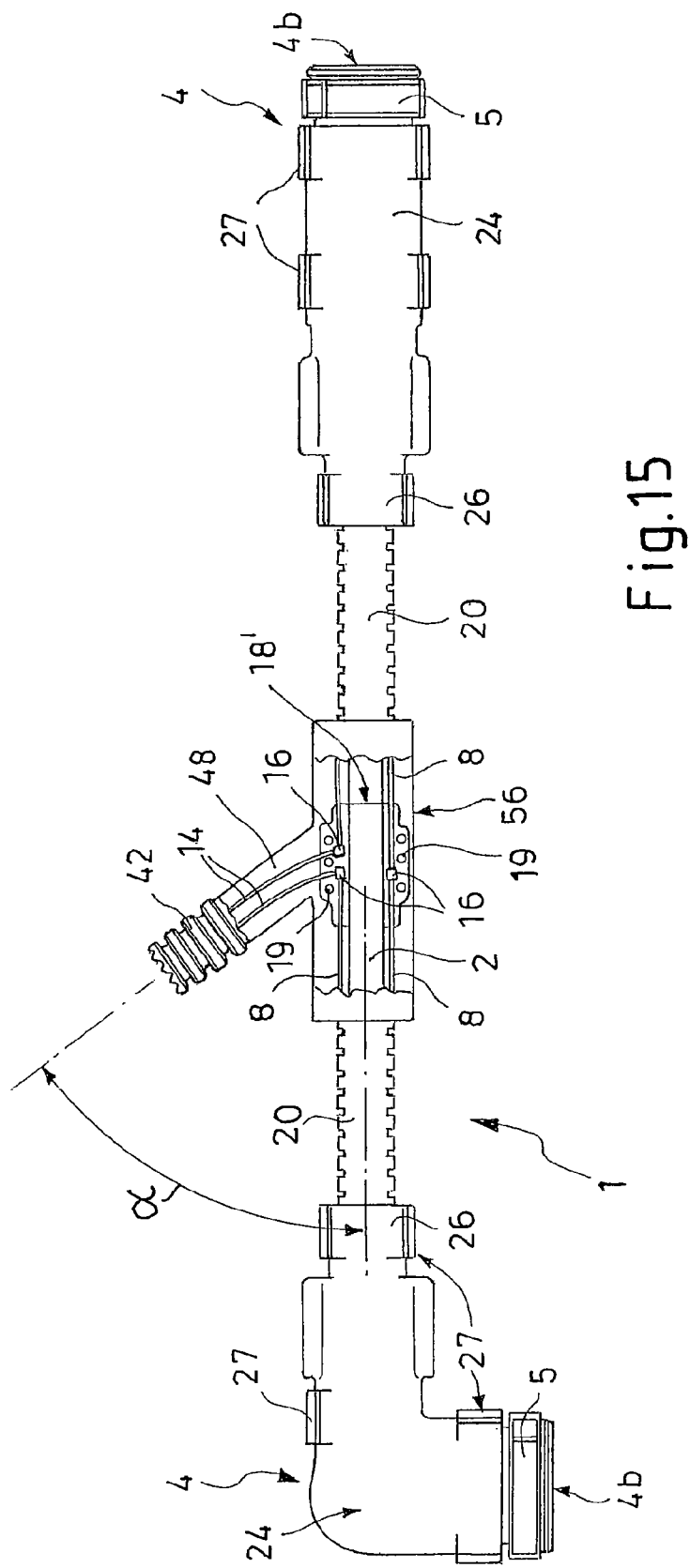
FIG. 15 shows the media line similar to FIG. 14 in a side view and an arrangement option.

In the version illustrated in FIG. 15, the connection of the heating leads 8 of the fluid line 2 to the external supply leads 14 is carried out by means of connections 16 in an arbitrary, approximately central area of the total length of the media line 1 spaced apart from the fluid connectors 4. Likewise, the electrical connections 16 are embedded in a molded attachment component 18'. A junction housing 56 that overall corresponds to the junction piece 44 can be positioned in this area and therefore form-fittingly receive the ends of the adjoining line sheaths 20 and particularly the lead sheath 42. Unlike the illustration according to FIG. 15, the ends of the sheaths 20 and preferably also of the lead sheath 42 can additionally be integrated in the attachment component 18. Likewise, the junction housing 56 can in addition be at least partially molded with plastic.

Figure 17:
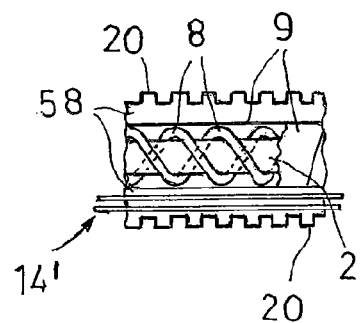
FIG. 17 is a detailed enlargement of area XVII in FIG. 16.
Figure 16:
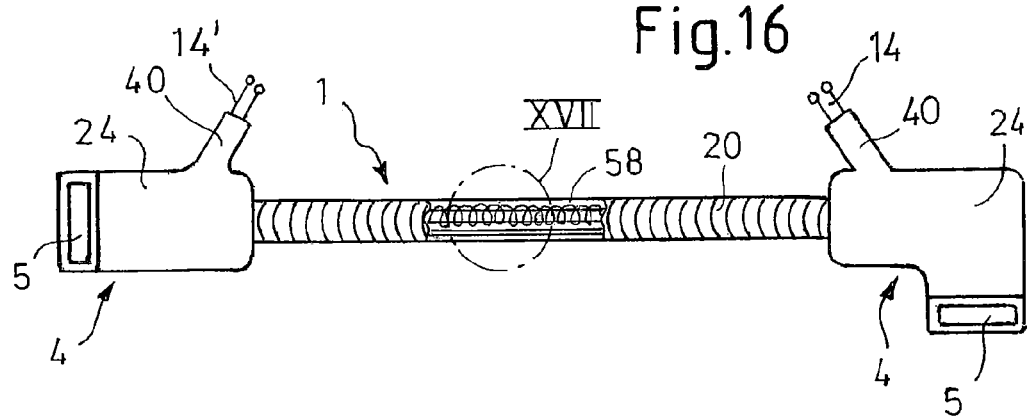
FIG. 16 is a side view of a made-to-measure media line in a special arrangement with a partially opened line enclosure.
Figure 18:
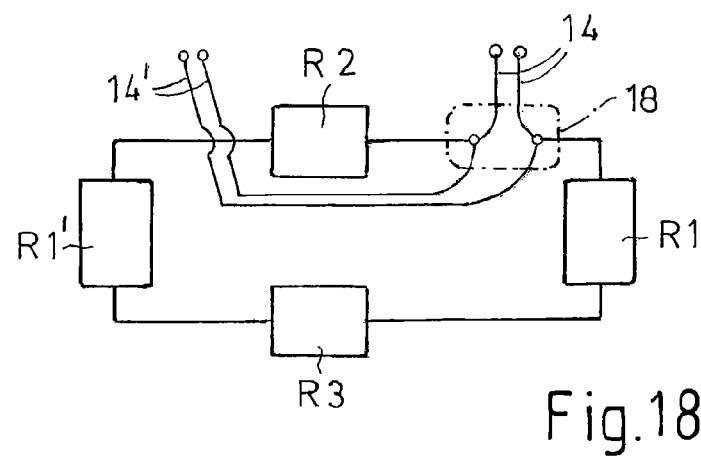
FIG. 18 is an electrical equivalent circuit diagram of the arrangement according to FIG. 16.

With regard to the arrangement of the media line 1 according to FIG. 16 through 18, it is practically configured as a combination of fluid- and electrical line, whereas electrical leads 14 that are inside the sheath 20 run directly among the fluid connectors 4. According to FIG. 17 the leads 14' run preferably within vacant space 58, which has an annular cross-section, between the fluid line 2 and the sheath 20 enclosed by the heating leads 8 and preferably the fixing layer 9. The leads 14' serve to advance a supply voltage (e.g. of a vehicle on-board voltage) between the fluid connectors 4, so that the supply voltage can advantageously be supplied or tapped at each connector 4, particularly via its housing junction 40. In this respect, reference is made to the circuit diagram in FIG. 18.

Finally, some special features of the arrangements according to FIG. 19 through 21 will be explained, whereas similar components such as in FIG. 1 through 18 are identified with the same reference numerals and need not be described again.

The fluid connector 4 has a tube portion-shaped connection section 60, said connection section having an outer circumference area that tapers slightly conically towards its free end and which forms a functional surface 62 for the sheath 20 where the sheath 20 of the fluid line 2 can be force-fittingly (clamped) attached to the functional surface 62 to achieve a preliminary fixation as well as a circumferential seal. This fixates the sheath 20 during the molding process.

Figure 19:
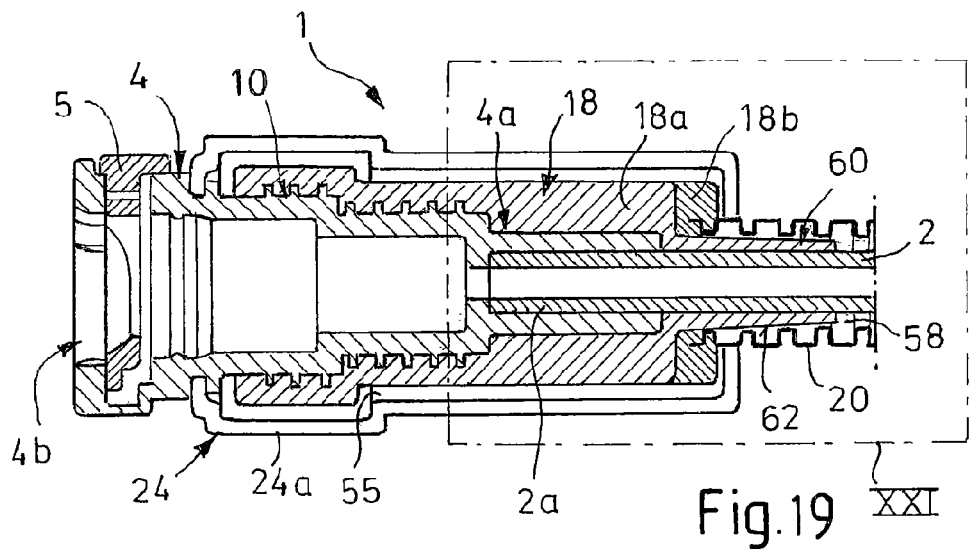
FIG. 19 is a longitudinal section of the end section of a media line with fluid line and fluid connector according to the present invention in an alternative embodiment.

In the arrangement according to FIG. 19, the connection section 60 to the functional surface 62 is comprised by a first attachment component 18a, this first attachment component 18a in a first step being formed by molding (e.g. molding or over-molding). Once the sheath 20 is attached to the connection section 60, a second attachment component 18b is formed by a corresponding molding process (molding or over-molding) including the end of the sheath 20 in such a manner that both components 18a and 18b join to become the attachment component 18.

Figure 20:
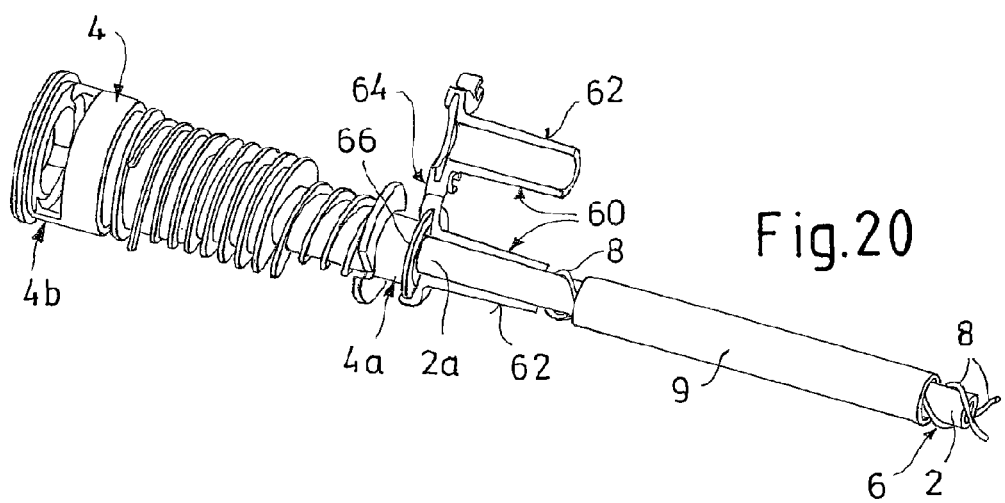
FIG. 20 is a perspective view of the arrangement according to FIG. 19 in an embodiment option and in a pre-assembly state.

According to FIG. 20, the connection section 60 can also comprise a component of a separate unit 64, which is preferably comprised of two half-shells that are, for example, connected by means of an articulated integral hinge, so that they can be folded together while integrating a support section 66 of the fluid connector 5. It is then possible to attach the sheath 20 and mold the attachment component 18. The support section 66 is preferably configured as an annular bar, which is received in a radial groove of the separate unit 64. This achieves a form-fitting connection between the unit 64 and the fluid connector 4.

Figure 21:
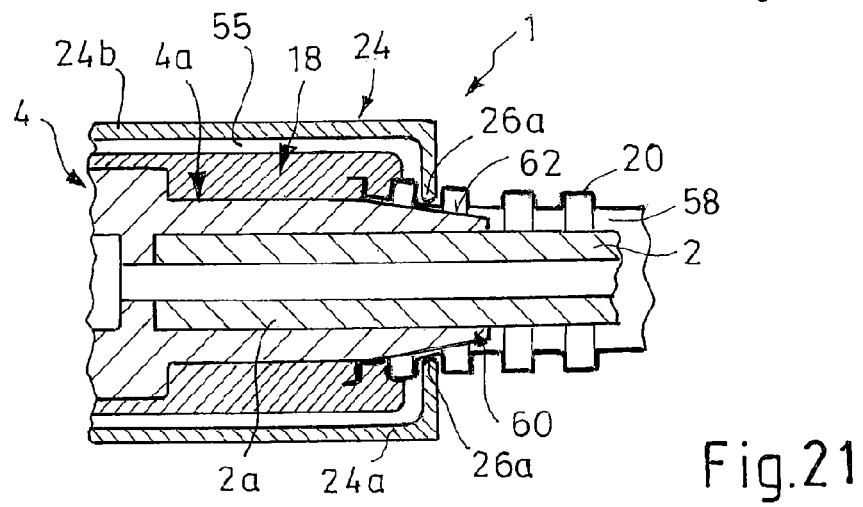
FIG. 21 is a partial sectional view of the area XXI of FIG. 19 in a further embodiment option in the connection area of the fluid line and fluid connector.

In the construction variant according to FIG. 21, the connection section 60 is a one-piece end section of the connecting section 4a of the fluid connector 4.

In addition to the arrangements described so far, it should be mentioned that either a "hot melt" compound or cold molding process can be used to form the attachment component 18. Depending on the arrangement of the attachment component 18, the external housing 24 may not be definitely necessary. If an external housing 24 is, however, installed, it may be advantageous if the attachment component 18 has functional elements (surfaces) which will simplify the installation (positioning/centering) of the housing components (not shown).

The present invention is not limited to the particular exemplary embodiments illustrated and described herein, but also includes all arrangements that are identically operating within the scope and spirit of the present invention.

While the above description constitutes the preferred embodiment of the present invention, it will be appreciated that the invention is susceptible to modification, variation, and change without departing from the proper scope and fair meaning of the accompanying claims.

The invention claimed is:

1. An electrically heatable media line, comprising, a fluid line and at least one fluid connector having a connecting section engaging an end of the fluid line, where the fluid line and the fluid connector have electric heating means for heating respectively the fluid line and the fluid connector, the fluid line together with its heating means is enclosed by a sheath, the heating means of the fluid connector is formed by at least one heating lead extending over a circumferential surface of the fluid connector, the fluid line and the fluid connector are enclosed by an attachment component formed by a plastic molding compound in a transitional area partially integrating the end of the fluid line and the connecting section of the fluid connector, the fluid connector in at least the area of the at least one heating lead extending over the circumferential surface being enclosed by an external housing and a remaining vacant interior space of the external housing containing an air volume for heat insulation.

2. The media line according to claim 1, further comprising the fluid line and the fluid connector are over-molded with the plastic molding compound.

3. The media line according to claim 1 wherein the attachment component, which is formed by means of the molding compound, also integrates an end section of the sheath.

4. The media line according to claim 3, wherein electric connections of the respective heating means are embedded in the molded plastic and at least one electrical supply lead is connected to one of the electric connections and is routed outward from the attachment component.

5. A media line according to claim 3, wherein with its end section, the sheath is rigidly attached to a conical functional surface of a sheath connection section of the fluid connector.

6. The media line according to claim 1, wherein a heating lead is fixed on the fluid line by means of a fixing layer.

7. The media line according to claim 1, wherein the external housing consists of two half shell-type housing halves that can be locked together.

8. The media line according to claim 7, wherein the external housing also integrates the fluid line and the sheath, wherein the sheath is fixated in a form-fitting manner within the external housing.

9. The media line according to claim 7, wherein the attachment component is formed by an over-molded plastic molding compound and is fixed in the external housing in a form-fitting manner.

10. The media line according to claim 7, wherein the external housing has at least one through-opening for an electrical supply lead.

11. The media line according to claim 7, wherein the external housing has one tube portion-shaped junction for supply leads.

12. The media line according to claim 11, wherein the junction also receives one end of a lead sheath in a form-fitting manner by a corrugated tube.

13. The media line according to claim 7, further comprising a junction piece that is comprised of two half-shells with a tubular passage section that encloses the fluid line and a junction for a supply lead, wherein the passage section with one end is directly connected to the external housing and with the other end receives the sheath of the fluid line in a form-fitting manner.

14. The media line according to claim 7, wherein on the outside of the external housing or junction piece enclosing the fluid line there is an electrical connector piece retainer in a fixed position.

15. The media line according to claim 1, wherein the external housing has at least one opening for adding the molding compound.

16. The media line according to claim 1, wherein at a location of its length spaced apart from the fluid connector, the fluid line including electrical connections of the respective heating means, is enclosed, by molding or over-molded with plastic.

17. The media line according to claim 16, wherein the fluid line enclosed by molding or over-molded with plastic is additionally enclosed by a junction housing.

18. The media line according to claim 1, wherein the fluid line is connected with its line end to the fluid connector in a firmly bonded manner, by means of laser welding.

19. The media line according to claim 1, wherein two fluid connectors are connected at ends of the fluid line and the sheath, in a vacant space between the fluid line and the sheath there is the heating means for the fluid line comprising at least one set of electrical leads that connect between external supply leads in an area of each of the two fluid connectors.

* * * * *